Aug. 1, 1933.    H. L. HALBACH    1,920,692
GLASS DRAWING TANK
Filed June 23, 1932
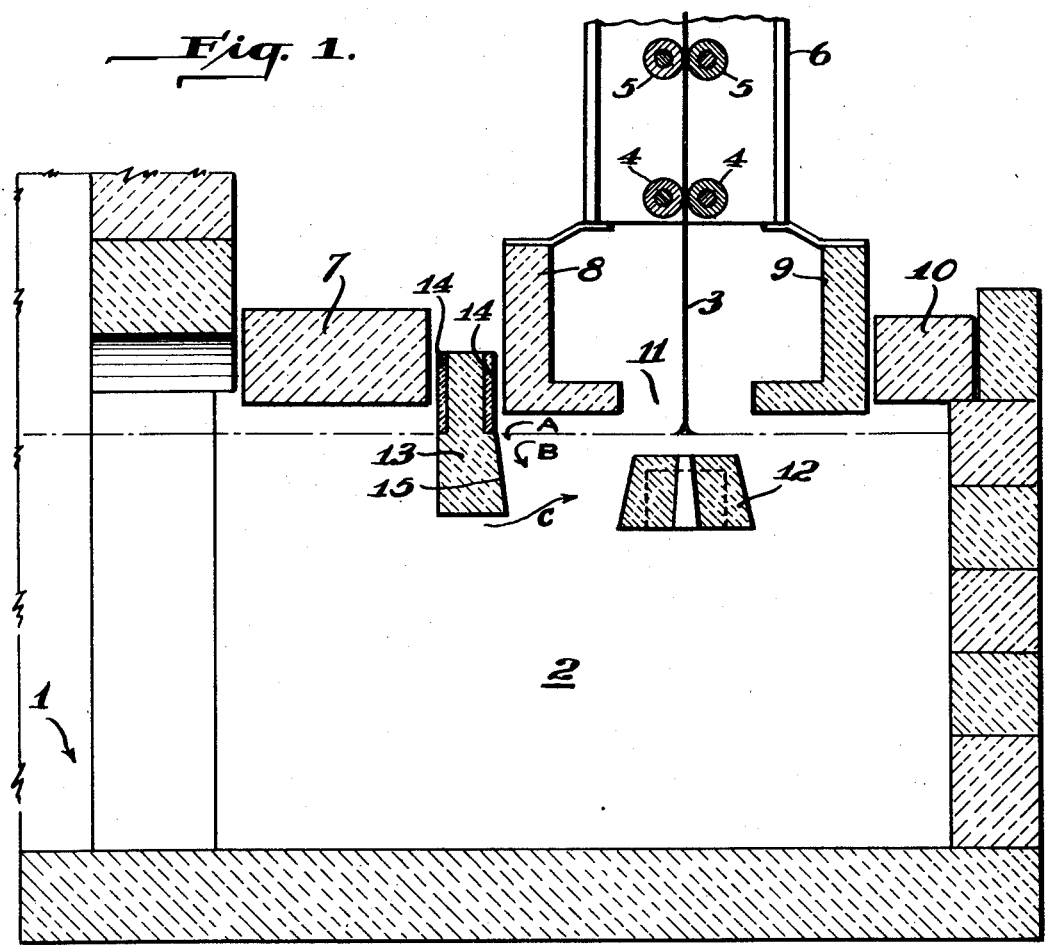
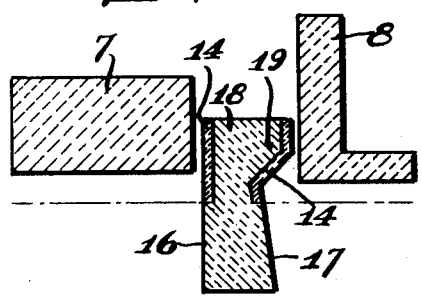
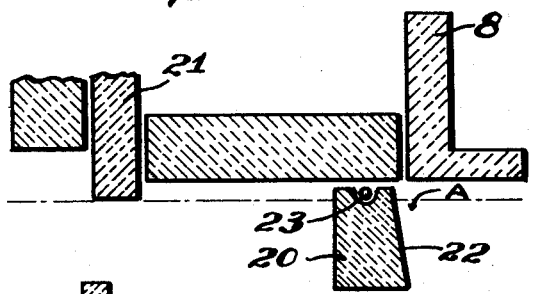
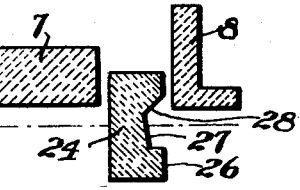
INVENTOR
Howard L. Halbach
by
Bradley & Bee
Attys Patented Aug. 1, 1933

1,920,692

UNITED STATES PATENT OFFICE 1,920,692

GLASS DRAWING TANK

Howard L. Halbach, Clarksburg, W. Va., assignor to Pittsburgh Plate Glass Company, a Corporation of Pennsylvania Application June 23, 1932. Serial No. 618,830

6 Claims. (Cl. 49—17)

The invention relates to a glass drawing tank from which sheet glass is to be drawn and relates particularly to the clay work used in the glass bath from which the sheet is drawn. Heretofore a cut off gate or "shear cake" has been used at the entrance end of the draw tank or dog house to cut off the heat from the melting tank, and a floating skim bar has been used intermediate the gate and the point of draw in order to prevent surface impurities from working along the surface of the bath and becoming incorporated into the sheet. One object of the present improvement is to combine the cut off gate and skim bar and thus simplify the structure. A further and more important object is to construct the skim bar so that the operation of skimming the bath between the skim bar and the line of draw is partly, or entirely, eliminated. This skimming operation has always been necessary at short intervals to avoid the formation of lines in the glass sheet on the side next to the melting tank. The lines come from the skim bar, and are due to the reaction of the glass on the clay of the skim bar at the surface of the glass. This reaction roughens the surface of the clay so that the glass skin which goes into the surface of the sheet is roughened or lined instead of being perfectly smooth, as would be the case if the skin was pulled away from a perfectly smooth or polished surface on the skim bar. The lines are also partly due to minute particles of clay which detach themselves from the roughened surface of the skim bar and are stretched out into threads or strings, which are perfectly transparent, but have an index of refraction different from the body of glass in the sheet, so that they appear as lines in such sheet. Skimming from time to time lessens this trouble, but involves considerable labor and introduces defects into the sheet due to the disturbance of the bath. Cold glass which is pulled to the sides of the bath by the skimming iron becomes incorporated into the edges of the sheet tending to cause unevenness and breakage. In some cases also bubbles are incorporated into the glass due to the use of the iron.

Briefly stated the requirement for skimming is avoided with the improved skim bar by constructing it so that the glass lying next to the skim bar is caused to circulate downward into the main body of glass beneath. As a result, the defects formed in the surface skin of glass which touches the skim bar are not incorporated into the surface of the glass sheet. Certain embodiments of the invention are illustrated in the accompanying drawing, wherein:

Figure 1 is a vertical section through the apparatus. And Figs. 2, 3 and 4 are partial sections showing modifications.

Referring to Fig. 1, the reference numeral 1 indicates the end of the melting tank which may be of any approved type and 2 is a drawing extension or dog house which communicates at its left hand end with the melting tank. The glass sheet 3 is drawn continuously from the body of molten glass in the extension 2 by means of pairs of rollers 4, 4, 5, 5, etc. which carry the glass upwardly in a continuous ribbon through the leer casing 6 at the top of which casing the glass is cut into sections in the usual way. A draw bar 12 of refractory material lies in the body of glass in the extension 2 and performs the usual functions of maintaining the position of the line of draw and giving a cooler layer of glass from which to draw the sheet than would be the case if the draw bar were not employed. The cover for the forehearth comprises the clay members 7, 8, 9 and 10 arranged as shown in the drawing with the space 11 between the members 8 and 9 for the passage of the sheet.

Located between the entrance of the extension 2 and the draw bar 12 is a combined skim bar and cut off gate 13 which is supported in the position shown by any suitable means. This block has its upper portion above the surface of the glass so that it acts as a cut off preventing the passage of the heated gases from the melting tank to the point from which the sheet 3 is drawn. This cut off gate permits of more even control of temperature conditions in the portion of the tank from which the sheet is drawn as is well known in the art. In order to better protect the portion of the member 13 lying above the surface of the glass, the front and rear portions are covered with layers 14, 14 of material which is more refractory than the main body of the bar. The portion of the bar which lies below the surface of the gate has its front face inclined downwardly and forwardly, as indicated at 15 in the drawing, and this constitutes a feature of primary importance in the improvement. This particular construction provides a shelf which screens the glass lying thereabove at the point A somewhat from the radiation of heat from the body of glass beneath the bar. As a result the glass at this point is cooler than would otherwise be the case and cooler than the glass lying therebeneath. This cooler glass, therefore, tends to move downward, as indicated by the arrow B, and commingle with the hotter glass flowing to the right through the extension, as indicated by the arrow C. This downward circulation along the inclined surface 15 thus carries downward any defective glass formed at the surface of the bath where it touches the skim bar. The defects at the surface of the glass under these conditions are kept from moving along the surface of the bath and being drawn up into the surface of the sheet 3. Since the defects are eliminated by carrying them downward into the main body of glass, it becomes unnecessary to skim the bath, so that with a skimming bar constructed as shown, this skimming operation may be eliminated and a sheet produced which is free from lines and free from defects ordinarily incident to or resulting from the skimming operation. The skim bar is located at a substantial distance from the meniscus (curved base) of the glass sheet being drawn, so that the surface flow of glass toward the sheet will not carry with it the cooler surface glass closely adjacent to the skim bar, which, as heretofore explained, must circulate downwardly in order to avoid defects from the bar being carried into the sheet. The definition of the location of the bar as "remote from the meniscus of the sheet", as used in the claims, is intended to define a separation of such dimension as to permit that part of the surface glass lying above the forward extension 15 on the skim bar to move toward the bar and downwardly.

Fig. 2 illustrates a modification in which the lower portion 16 of the skim bar has an inclination less than that in the Fig. 1 construction, as indicated at 17. The upper portion 18 of the skim bar is also provided with an overhang 19 which is not found in the construction of Fig. 2. This arrangement gives the same general result as heretofore explained in connection with Fig. 1.

Fig. 3 illustrates a further modification in which the skim bar 20 and gate 21 are made separate instead of being made in one piece as in the construction of Fig. 1. The gate 21 in this case is placed at the entrance of the drawing extension which is the common arrangement in the art. The skim bar 20 has substantially the same shape as the lower portion of the member 13 in the Fig. 1 construction and the function accomplished incident to the inclined surface 22 is the same as that heretofore described in connection with the Fig. 1 construction. If it is desired to secure an additional cooling effect upon the glass at the point A, this may be accomplished by providing a groove in the upper portion of the skim bar and fitting a pipe 23 in this groove through which a cooling flow of liquid is passed. Too much cooling, however, must be guarded against as excessive cooling is inclined to produce devitrification. Numerous other variations of the construction may be made, the result to be accomplished in each case being the cooling of the glass where its surface contacts with the front face of the skim bar so that a downward circulation is produced to break the skin on the surface of the glass, carry any defects at this point downward and thus avoid the necessity of frequent applications of a skimming iron as has heretofore been necessary.

Fig. 4 illustrates a modification in which the skim bar 24 is provided with a shelf 26 lying at the lower edge of the inclined surface 27, and with an overhang 28 corresponding to the overhang 19 of the Fig. 2 construction. A downward circulation of glass along the inclined surface is produced, as explained in connection with the other modifications.

What I claim is:

1. In combination in apparatus for making sheet glass including a melting tank and a drawing extension communicating therewith, means for drawing a glass sheet from the extension, and a skim bar of refractory material lying in the glass bath between the inlet end of the drawing extension and the line of draw remote from the meniscus of the sheet having its side toward the line of draw extending downwardly and forwardly from the glass level.

2. In combination in apparatus for making sheet glass including a melting tank and a drawing extension communicating therewith, means for drawing a glass sheet from the extension, and a skim bar of refractory material lying partly above and partly below the surface of glass between the line of draw of the glass sheet and the melting tank remote from the meniscus of the sheet and having its front face inclined forwardly so as to partially shield the glass lying above the shelf next to the surface of the bath from the radiant heat of the body of glass directly beneath the bar.

3. In combination in apparatus for making sheet glass including a melting tank and a drawing extension communicating therewith, means for drawing a glass sheet from the extension, and a skim bar of refractory material lying partly above and partly below the surface of glass between the line of draw of the glass sheet and the melting tank remote from the meniscus of the sheet and having its front face in a plane which is upright but inclined away from the line of draw from its lower edge up.

4. In combination in apparatus for making sheet glass including a melting tank and a drawing extension communicating therewith, having a cover over the portion next to the melting tank spaced above the level of the glass, means for drawing a glass sheet from the forward end of the extension, and a combined skim bar and cut off gate of refractory material lying in the glass bath between the inlet of the extension and line of draw remote from the meniscus of the sheet and closing the space between the surface of the glass and the cover, said bar having a forwardly extending shelf on its front face which lies below the surface of the glass.

5. In combination in apparatus for making sheet glass including a melting tank and a drawing extension communicating therewith, means for drawing a glass sheet from the extension, and a skim bar of refractory material lying in the glass bath between the inlet end of the drawing extension and the line of draw remote from the meniscus of the sheet having its side toward the line of draw provided with a forwardly extending shelf below the surface of the glass.

6. In combination in apparatus for making sheet glass including a melting tank and a drawing extension communicating therewith, means for drawing a glass sheet from the extension, and a skim bar of refractory material lying in the glass bath between the inlet end of the drawing extension and the line of draw remote from the meniscus of the sheet having its side toward the line of draw provided with two forwardly extending shelves, one lying below the surface of the glass and the other above such surface.

HOWARD L. HALBACH.